(12) United States Patent
Hemmer et al.

(10) Patent No.: US 11,469,436 B2
(45) Date of Patent: Oct. 11, 2022

(54) FUEL CELL DEVICE

(71) Applicant: ElringKlinger AG, Dettingen (DE)

(72) Inventors: Stefan Hemmer, Metzingen (DE);
Jürgen Kraft, Metzingen (DE);
Manuel Morcos, Tübingen (DE);
Michael Götz, Dettingen/Erms (DE);
Wadim Kaiser, Reutlingen (DE)

(73) Assignee: ElringKlinger AG, Dettingen (DE)

( * ) Notice: Subject to any disclaimer, the term of this patent is extended or adjusted under 35 U.S.C. 154(b) by 294 days.

(21) Appl. No.: 16/734,357

(22) Filed: Jan. 5, 2020

(65) Prior Publication Data

US 2020/0144651 A1    May 7, 2020

Related U.S. Application Data

(63) Continuation of application No. PCT/EP2018/069146, filed on Jul. 13, 2018.

(30) Foreign Application Priority Data

Jul. 14, 2017    (DE) ..................... 10 2017 212 085.1
Jul. 14, 2017    (DE) ..................... 10 2017 212 091.6

(51) Int. Cl.
*H01M 8/248* (2016.01)
*H01M 8/2475* (2016.01)
(Continued)

(52) U.S. Cl.
CPC ....... *H01M 8/248* (2013.01); *H01M 8/04164* (2013.01); *H01M 8/04201* (2013.01); *H01M 8/2475* (2013.01); *H01M 8/2485* (2013.01)

(58) Field of Classification Search
CPC .......................... H01M 8/248; H01M 8/04201
See application file for complete search history.

(56) References Cited

U.S. PATENT DOCUMENTS

| 4,615,107 A | 10/1986 | Kumeta et al. |
| 6,541,148 B1 | 4/2003 | Walsh et al. |
| (Continued) | | |

FOREIGN PATENT DOCUMENTS

| CN | 101465435 B | 11/2010 |
| CN | 203659995 U | 6/2014 |
| (Continued) | | |

*Primary Examiner* — Christopher P Domone
(74) *Attorney, Agent, or Firm* — Aslan Law, P.C.

(57) ABSTRACT

In order to provide a fuel cell device which can be produced simply and cost-effectively, it is proposed that the fuel cell device comprises the following: a plurality of fuel cell elements which are stacked one on top of another along a stacking direction and form a fuel cell stack; a clamping device for securing the fuel cell elements; a fluid guide unit for supplying fuel and/or oxidizer and/or coolant to the fuel cell elements and/or for removing fuel and/or oxidizer and/or exhaust gas and/or coolant from the fuel cell elements, wherein the clamping device comprises two or more crossmembers which extend at least approximately perpendicularly to the stacking direction, wherein in each case at least one crossmember is arranged at each end of the fuel cell stack, wherein the crossmembers can be drawn towards one another by means of clamping elements and the fuel cell stack can thereby be clamped between the crossmembers.

21 Claims, 13 Drawing Sheets

(51) Int. Cl.
  *H01M 8/04119* (2016.01)
  *H01M 8/04082* (2016.01)
  *H01M 8/2485* (2016.01)

(56) References Cited

U.S. PATENT DOCUMENTS

| | | |
|---|---|---|
| 6,645,659 B2 | 11/2003 | Bisaka et al. |
| 7,745,035 B2 | 6/2010 | Yamauchi et al. |
| 8,216,737 B2 | 7/2012 | Sommer et al. |
| 9,236,628 B2 | 1/2016 | Naito et al. |
| 9,806,369 B2 | 10/2017 | Wilson et al. |
| 10,511,046 B2 | 12/2019 | Watanabe |
| 2004/0062967 A1* | 4/2004 | Chaix .................. H01M 8/241 429/457 |
| 2005/0095485 A1* | 5/2005 | Saulsbury .......... H01M 8/0247 429/433 |
| 2009/0269652 A1 | 10/2009 | Hafemeister |
| 2011/0076585 A1 | 3/2011 | Edmonston et al. |
| 2015/0086886 A1 | 3/2015 | Blank et al. |
| 2016/0006069 A1 | 1/2016 | Gerhardt et al. |
| 2016/0172703 A1* | 6/2016 | Horlock .............. H01M 8/2484 429/456 |
| 2017/0033395 A1* | 2/2017 | Guthrie ............... H01M 8/2475 |

FOREIGN PATENT DOCUMENTS

| | | |
|---|---|---|
| DE | 101 35 025 A1 | 3/2002 |
| DE | 101 53 372 B4 | 5/2005 |
| DE | 10 2006 042 109 B4 | 12/2011 |
| DE | 10 2012 006 948 A1 | 10/2013 |
| DE | 10 2012 219 022 A1 | 4/2014 |
| DE | 10 2012 024 964 A1 | 6/2014 |
| DE | 10 2013 206 335 A1 | 10/2014 |
| DE | 10 2010 018 417 B4 | 11/2014 |
| DE | 10 2004 049 623 B4 | 3/2015 |
| DE | 10 2015 109 886 A1 | 12/2015 |
| DE | 10 2015 012 866 A1 | 5/2016 |
| DE | 10 2016 004 823 A1 | 10/2017 |
| EP | 2 434 570 A1 | 3/2012 |
| EP | 2 898 562 A1 | 3/2014 |
| EP | 2 898 562 B1 | 11/2018 |
| JP | 2005-294155 A | 10/2005 |
| JP | 2013-004352 A | 1/2013 |
| JP | 5971618 B2 | 8/2016 |
| KR | 10-1479836 B1 | 1/2015 |
| KR | 10-1543131 B1 | 8/2015 |
| WO | WO 95/28010 A1 | 10/1995 |
| WO | WO 2014/045014 | 3/2014 |

\* cited by examiner

FUEL CELL DEVICE

RELATED APPLICATION

This application is a continuation of international application No. PCT/EP2018/069146 filed on Jul. 13, 2018, and claims the benefit of German application No. 10 2017 212 085.1 filed on Jul. 14, 2017 and of German application No. 10 2017 212 091.6 filed on Jul. 14, 2017, which are incorporated herein by reference in their entirety and for all purposes.

FIELD OF DISCLOSURE

The present invention relates to the field of fuel cell devices, in particular of components which are required for the assembly and the supply of a fuel cell stack of a fuel cell device.

BACKGROUND

For example, an end plate for a fuel cell stack is known from DE 10 2004 049 623 B4.

SUMMARY OF THE INVENTION

The present invention is based on the object of providing a fuel cell device which can be produced simply and cost effectively.

This object is achieved according to the invention by the features of Claim 1.

A fuel cell device preferably comprises a fuel cell stack which is in particular a stack of fuel cell elements. The fuel cell elements are in particular plate-like units which have different components for the electrochemical conversion of fuel, for guiding current and for guiding fluid.

A fuel cell device furthermore preferably comprises one or more supply units which in particular provide fuel and/or oxidizer, for example hydrogen and air. Furthermore, one or more supply units can be provided for cooling or controlling the temperature of the fuel cell stack in some other way.

There are also associated with the fuel cell stack a fuel supply means, a fuel removal means, an oxidizer supply means, an oxidizer removal means and/or an exhaust gas guide and also a coolant guide in order to be able to supply the fuel cell stack with fuel, oxidizer and/or coolant and to be able to remove fuel, oxidizer, exhaust gas and/or coolant from the fuel cell stack.

It may be favourable if a fuel cell device has a media module. Such a media module serves in particular for the simultaneous guidance of a plurality of fluids, as a result of which in particular a compact construction can be realized.

The fuel cell stack is preferably clamped along a stacking direction by means of a clamping device, and therefore in particular the fuel cell elements are pressed against one another and reliable sealing can thereby be obtained.

A fuel cell device furthermore preferably comprises a housing, in particular a cylindrical casing, which surrounds the fuel cell stack. In particular those components of the fuel cell device which carry current and/or are under electric voltage are protected by means of the housing against undesirable contact.

Preferably only connection elements, in particular conducting pins, protrude from the housing in order to be able to tap off the voltage generated by means of the fuel cell device and consequently the electrical energy which is generated.

It may be favourable if a fuel cell device comprises the following:
a plurality of fuel cell elements which are stacked one on top of another along a stacking direction and form a fuel cell stack;
a fluid guide unit for supplying fuel and/or oxidizer and/or coolant to the fuel cell elements and/or for removing fuel and/or oxidizer and/or exhaust gas and/or coolant from the fuel cell elements, wherein the clamping device comprises two or more crossmembers which extend at least approximately perpendicularly to the stacking direction, wherein in each case at least one crossmember is arranged at each end of the fuel cell stack, wherein the crossmembers are drawable towards one another by means of clamping elements and the fuel cell stack is thereby clampable between the crossmembers.

It may be favourable if the clamping device has at least two crossmembers for each of the two ends of the fuel cell stack. By this means, in particular a uniform introduction of force into the fuel cell stack can be achieved.

The crossmembers are preferably drawable towards one another by means of clamping rods, in particular threaded rods.

The clamping elements are therefore preferably clamping rods which are usable in particular with the use of screw nuts for clamping together the crossmembers of the fuel cell stack arranged in between.

It may be advantageous if the clamping elements run completely outside the fuel cell stack.

In particular, the clamping elements are preferably arranged spaced apart from the fuel cell stack and/or insulated electrically and/or thermally therefrom.

The clamping device preferably comprises one, two or more pairs of crossmembers, wherein in each case one crossmember of a pair of crossmembers is arranged at one end each of the fuel cell stack. The clamping device furthermore preferably comprises two clamping elements in each case for each pair of crossmembers, said clamping elements acting at mutually opposite ends of the crossmembers.

It may be favourable if the fuel cell stack is provided at one or at both of its ends with a respective end plate, wherein the clamping device preferably acts indirectly or directly on the one end plate or on the two end plates.

The end plate is preferably formed from an electrically insulating material or is provided therewith.

The material is preferably selected in such a manner that no voltage transmission and/or current transmission that puts the operation and/or the durability of the fuel cell device and/or the safety of operators at risk takes place from the fuel cell stack to the clamping device.

It can be provided that one end plate or both end plates is/are formed from a plastics material, in particular an injection-moulded plastics material.

Furthermore, it can be provided that the end plates are formed from a milled, extruded or cast metal material. In particular in this case, additional components, in particular electrically insulating components, for example an electrically insulating coating or intermediate layer, are preferably arranged on the one end plate or the plurality of end plates. The one end plate or the plurality of end plates are then in particular hybrid end plates, wherein, for example, a metallic core with a plastic sheath can be provided.

In one refinement of the invention, it is provided that one end plate or both of the end plates comprises/comprise a flow guide for guiding oxidizer, fuel, exhaust gas and/or coolant.

The flow guide preferably comprises one or more fluid lines for guiding oxidizer, fuel, exhaust gas and/or coolant.

In particular, the fluid lines for guiding the oxidizer, fuel, exhaust gas and/or coolant are arranged and/or configured so as to be completely separate fluidically from the clamping device.

In particular, the clamping device preferably does not come into contact with the fluids guided by means of the fluid lines.

It may be favourable if one end plate or both of the end plates each has/have a force transmission structure which transmits a force, which is applied by one or more of the crossmembers, to the fuel cell stack with a predetermined distribution of force.

The force transmission structure is preferably a three-dimensional structure, in particular lattice structure and/or honeycomb structure.

In particular, the force transmission structure preferably has a locally varying thickness.

Furthermore, it can be provided that the force transmission structure is formed by a locally varying thickness of the end plate.

The thickness here is in particular the extent parallel to the stacking direction.

It may be favourable if the force transmission structure is arranged and/or formed in the region of a plate receptacle for receiving a pressure distribution plate.

In particular, the force transmission structure comprises a honeycomb structure and/or rib structure and/or supporting structure. By this means, in particular, a stable and nevertheless material-saving configuration of the force transmission structure can be obtained.

The force transmission structure makes it possible in particular to realize homogeneous clamping of the fuel cell stack, in particular in order to compensate for thermal changes in extent and/or in order to compensate for shock and/or vibration loadings.

In particular if the force transmission structure is formed from a plastics material, in particular is formed integrally with the end plate and/or is formed by the latter, a high degree of component accuracy is preferably produced, as a result of which a particularly homogeneous surface pressure with low tolerances can ultimately be obtained.

It may be favourable if a side of the end plate that faces the fuel cell stack has a substantially level surface which, for example, forms a pickup receptacle for receiving a pickup unit. By this means, a uniform introduction of force into the fuel cell stack and preferably also a uniform surface pressure for sealing can likewise be obtained.

A material thickness of a pickup sheet of the pickup unit is preferably at least approximately 40 μm, for example at least approximately 50 μm, and/or at most approximately 400 μm, for example at most approximately 300 μm, in each case preferably plus a coating thickness.

It can be provided that the one end plate or the two end plates each has/have a pickup receptacle for receiving one pickup unit each, by means of which electrical energy generated in the fuel cell stack can be removed.

The pickup unit comprises in particular a pickup sheet which is of substantially planar design and abuts flatly against one end of the fuel cell stack, and also one or more, in particular two, pickup strips to each of which is connected a conducting pin or other connection.

The pickup strips are in particular arranged on diagonally mutually opposite regions of the pickup sheet which is preferably of substantially rectangular design. By this means, optimized current removal and/or optimized voltage distribution in the fuel cell stack can preferably be obtained.

Two such pickup units are preferably provided, wherein in each case one pickup unit is arranged at one end of the fuel cell stack each.

The conducting pins of the pickup units preferably form connection points for plug-in or screw connections or other possibilities for the connection of electric lines.

It may be favourable if the one end plate or the two end plates electrically insulate the pickup unit arranged in each case thereon and the clamping device from each other.

The clamping device preferably has one or two pressure distribution plates which in particular lie directly against end plates of the fuel cell stack and on which the crossmembers preferably indirectly or directly act.

The one pressure distribution plate or the two pressure distribution plates is/are preferably formed from a metallic material, in particular steel.

For example, the pressure distribution plates are produced in a milling process and/or casting process.

It may be favourable if the one pressure distribution plate or the plurality of pressure distribution plates is/are arranged in plate receptacles, which are formed substantially complementarily thereto, of the end plates. By means of such plate receptacles, in particular a desired positioning and/or centring of the pressure distribution plates relative to a force transmission structure can be ensured.

The crossmembers of the clamping device act on the one or the two pressure distribution plates preferably by means of in each case one or more spring elements, in particular disc springs.

In particular, the spring elements are clamped between crossmember and pressure distribution plate.

In addition, a centring ring and/or a guide disc can preferably be provided, in particular in order to position and/or to centre the one spring element or the plurality of spring elements relative to the respective crossmember and/or the respective pressure distribution plate.

Preferably, in each case one pressure distribution plate and two spring elements lying there against, in particular disc springs, and one or more crossmembers and preferably also one or more centring rings and/or guide discs are provided at each end of the fuel cell stack.

The one end plate or the two end plates is/are preferably configured in such a manner that they serve for transmitting force and for guiding current.

In particular, it can be provided that fuel, oxidizer, exhaust gas and/or coolant can be guided along the stacking direction on at least one crossmember and/or on a pressure distribution plate of the clamping device by means of the one end plate or the two end plates.

For this purpose, the one end plate or the two end plates preferably comprise fluid lines which extend in particular along the stacking direction and connect fluid lines formed in the fuel cell stack to the fluid guide unit, in particular the media module.

As an alternative or in addition to the features mentioned above, it can be provided that a fuel cell device comprises the following:

a plurality of fuel cell elements which are stacked one on top of another along a stacking direction and form a fuel cell stack;

a securing device for securing the fuel cell elements;

a fluid guide unit for supplying fuel and/or oxidizer and/or coolant to the fuel cell elements and/or for removing fuel and/or oxidizer and/or exhaust gas and/or coolant from the fuel cell elements, wherein the fluid guide unit comprises a basic body which comprises a plurality of fluid lines and connection points for the connection of supply lines and/or removal lines and/or additional components of the fuel cell device.

The fluid lines in the basic body can in this case in particular also comprise branching points or junctions.

It may be favourable if the basic body is of integral construction.

In particular, the basic body is produced in a single method step or at least the shaping thereof is substantially finished in a single method step.

The basic body can be formed, for example, as a plastics injection-moulded component.

The fluid guide unit is preferably configured in such a manner that only a plastics material for producing the fluid guide unit has contact with the guided media, possible sensor elements, etc. preferably being excluded therefrom.

A plurality of fluid lines of the fluid guide unit are preferably formed by recesses formed in the basic body and one or more cover elements covering said recesses.

The cover elements close in particular one or more chambers which are surrounded on two, three, four or five sides by the basic body.

In particular, a plurality of chambers are closed by means of a cover element.

It may be favourable if a single cover element is arranged on a side of the basic body that faces the fuel cell stack.

The cover element preferably extends here over an entire extent of the basic body and/or of the fuel cell stack in a plane running perpendicularly to the stacking direction.

It can be provided that the basic body is provided on two mutually opposite sides with one or more cover elements in each case. In particular if the one cover element or the plurality of cover elements also comprises/comprise recesses and/or other shaped regions for guiding fluid, intersecting fluid lines can preferably be thereby formed within the fluid guide unit, in particular a media module of the fluid guide unit.

Furthermore, the fluid guide unit can preferably be partially formed by one or more end plates, wherein the end plates in particular likewise comprise one or more fluid lines or are part of the latter.

The one cover element or the plurality of cover elements is/are preferably arranged on a side of the fluid lines of the fluid guide unit that faces the securing device.

The securing device is in particular a clamping device for clamping the fuel cell elements of the fuel cell stack.

It may be favourable if the basic body and the one cover element or the plurality of cover elements are connected to one another by plastics welding.

In particular, a fluid-tight and/or pressure-tight connection is provided here.

For the connection, in particular hot gas welding, infrared welding, laser welding, friction welding and/or laser-based infrared welding can be provided.

The basic body is preferably covered on one side or on both sides by means of in each case one or more cover elements.

The fluid guide unit preferably comprises a plurality of fluid lines which each extend through the basic body, one or more cover elements and an end plate of the fuel cell stack.

For this purpose, in particular the one cover element or the plurality of cover elements and the end plate of the fuel cell stack are preferably provided with one or more passage openings.

It may be advantageous if the fluid guide unit, in particular the basic body, comprises one or more separating devices for separating liquids and/or solids from a gas flow.

In particular, it can be provided here that the fluid guide unit comprises a droplet separator and/or baffle elements and/or deflecting elements.

For example, a separating device can be provided for separating water from an oxidizer flow and/or fuel flow.

In particular, one or more droplet separators are provided in each case at an anode inlet and/or an anode outlet.

One or more separating devices are preferably moulded into the basic body and/or formed by shaping of the basic body.

It may be favourable if the basic body comprises one or more valve receptacles for receiving one or more valve elements.

A valve element is in particular a throttle valve, a flushing valve, a pressure relief valve, a drainage valve, etc.

In particular, targeted removal of separated liquids and/or pressure regulation in the fuel cell device, in particular in the fuel cell stack, can be effected by means of one or more valve elements.

For example, a valve element designed as a throttle nozzle can be used in order to effect transport of water from a droplet separator at the anode inlet to a droplet separator at the anode outlet on the basis of an existing difference in pressure.

The basic body preferably comprises one or more sensor element receptacles for receiving one or more sensor elements.

One or more sensor elements are arranged in particular laterally adjacent to one or more fluid lines and/or projecting from a lateral direction into one or more fluid lines.

In particular a pressure and/or temperature can be determined by means of one or more sensor elements. The one sensor element or the plurality of sensor elements serves/serve in particular for controlling the fuel cell device.

It may be favourable if the basic body comprises one or more supporting elements, in particular supporting domes and/or supporting ribs, for stabilizing and/or reinforcing the basic body and/or the fluid guide unit.

It may be favourable if the basic body has supporting domes and/or supporting ribs which are in particular welded onto a cover element.

One or more supporting elements preferably serve at the same time for droplet separation, in particular on the basis of flow deflections and/or variations of the flow speed and/or flow cross sections.

By means of the targeted fluid guide within the basic body, temperature gradients arising during the operation of the fuel cell device can preferably be influenced locally in a targeted manner, in particular in order preferably to heat and/or to cool individual components of the fuel cell device.

As an alternative or in addition thereto, electric heating can be provided in some regions and/or some components.

It can be provided that the fluid guide unit is provided with one or more additional elements and/or one or more coatings, as a result of which in particular regions with increased heat conductivity and/or heat storage capacity are formed. This also preferably permits optimized temperature control.

For example, it can be provided that an efficient separation effect is obtained by surface texturing and/or surface modification. In particular, hydrophilic surfaces can be provided for the droplet separation.

For example, by means of droplet separation at an anode inlet and/or cathode inlet, dehumidification can take place upstream of a nozzle arrangement for circulating the gas flow, as a result of which ultimately icing at very cold temperatures can be reduced or entirely avoided.

Owing to the integration of the fluid lines in the fluid guide unit, pressure losses can preferably be reduced. It may be favourable if the fluid guide unit, in particular the basic body and/or one or more cover elements and/or one or more end plates of the fuel cell device have an at least partially after-treated, in particular coated, surface. By this means, thermal and/or other properties of the walls of the fluid lines can be influenced in a targeted manner, in particular for the targeted supply of heat and/or removal of heat and/or for optimizing separating effects.

The fluid guide unit preferably comprises a thermally insulating portion by means of which the securing device and/or the fluid lines and/or one or more separating devices and/or one or more valve devices are separated from the fuel cell stack and are thermally separated.

The thermally insulating portion is formed in particular by an end plate, for example a force transmission structure of the end plate.

The fluid guide unit is preferably connected to the fuel cell stack by the fact that an end plate, which is preferably part of the fluid guide unit, is clamped between a pressure distribution plate and the fuel cell stack by means of crossmembers of a clamping device.

A media module, in particular a basic body and one or more cover elements of the fluid guide unit, is preferably connected to the end plate by means of plastics welding, as a result of which the fluid guide unit is mechanically secured to the fuel cell stack.

A housing, in particular a hollow-cylindrical casing with a substantially rectangular basic surface, preferably extends from one end plate to the further end plate, wherein transition regions between the housing and the respective end plate are preferably sealed off by means of seals.

Furthermore, it can be provided that the housing can be positioned relative to the fuel cell stack by means of one or more centring elements, in particular centring caps.

The housing is formed, for example, from a flat material, in particular from a preshaped flat material.

The housing can comprise, for example, a plastics material and/or a metallic material or can be formed therefrom.

The housing is preferably of electrically insulating construction or is at least provided with an electrically insulating coating and/or covering.

The fluid guide unit preferably comprises a plurality of connection points which is adaptable in a simple manner, in particular by means of plug-in flanges, to differently dimensioned connection lines, supply lines, removal lines, etc.

By this means, different power classes of the fuel cell device can be realized in particular using one and the same fluid guide unit.

The end plate provided with the pickup unit is preferably implemented analogously to the fuel cell elements, in particular bipolar plates of the fuel cell elements. By this means, use can preferably be made of the configuration of a seal GDL unit (Gas Diffusion Layer) also used between the fuel cell elements and/or in the fuel cell elements. This permits in particular a uniform sealing function around the fluid lines and a reliable electric contact connection.

The fuel cell device according to the invention is preferably usable in any desired installation position.

The fluid lines, which are also called manifolds, are preferably configured in such a manner that liquid water accumulates in particular in regions which lie below the inlets and/or outlets of the fuel cell stack in a vertical orientation of the fuel cell elements. This preferably avoids water flowing into the fuel cell stack.

As an alternative or in addition, it can be provided that one or more bypass lines and/or water removal lines are provided in order to remove liquid water in a targeted manner from the fuel cell stack and/or from the regions surrounding the fuel cell stack.

Further preferred features and/or advantages of the invention are the subject matter of the description below and the illustration in the drawings of an exemplary embodiment.

Figure 1:
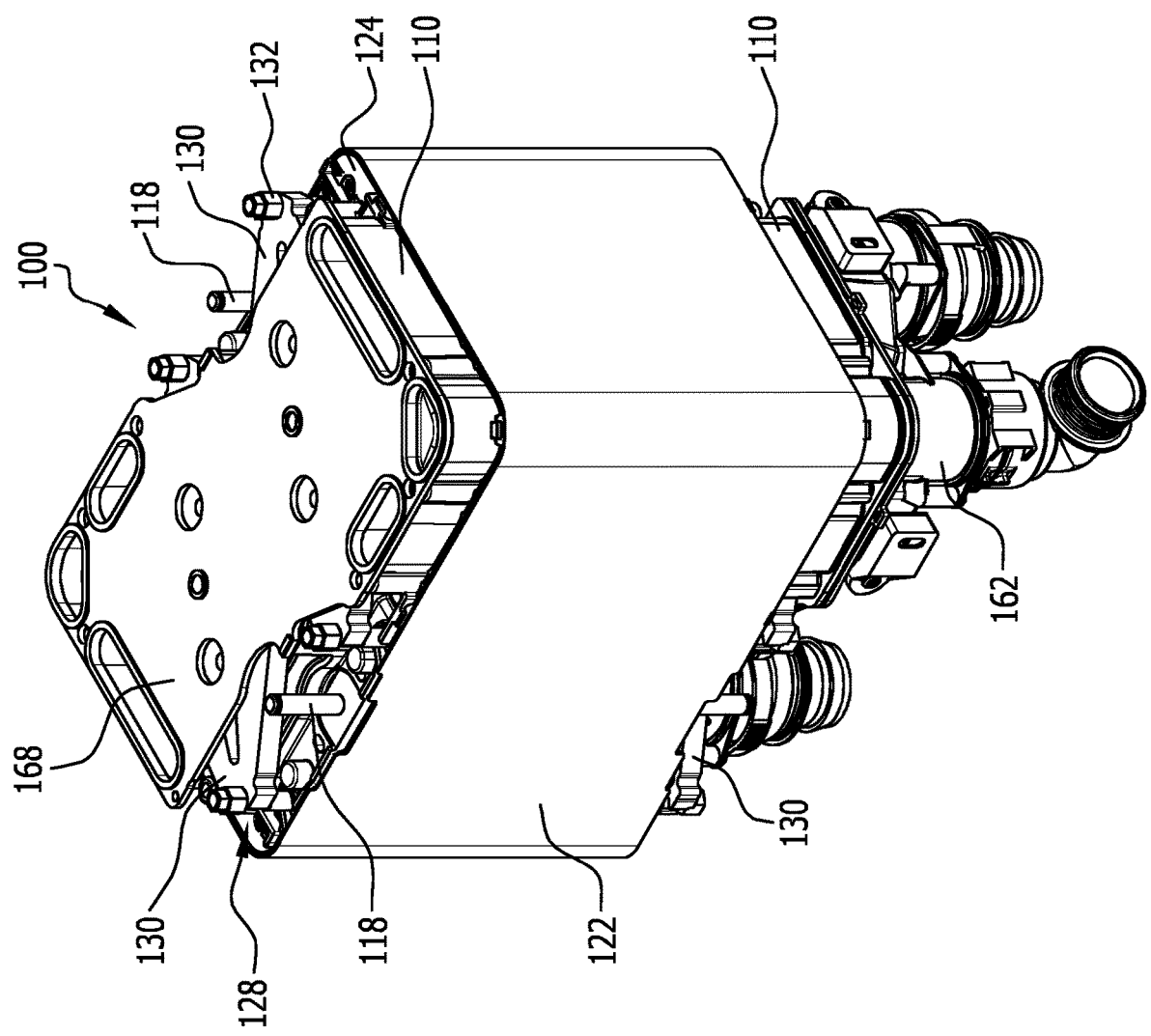
FIG. 1 shows a schematic perspective illustration of a fuel cell device looking at an upper side of the fuel cell device.

Identical or functionally equivalent elements are provided with the same reference signs in all of the figures.

DETAILED DESCRIPTION OF THE DRAWINGS

An embodiment, which is illustrated in FIGS. 1 to 14, of a fuel cell device, denoted as a whole by 100, serves in particular for generating electrical energy by electrochemical conversion of fuel with oxidizer, for example hydrogen with atmospheric oxygen.

The fuel cell device 100 comprises a plurality of fuel cell elements 102, for example 50, 100 or 200, which are stacked one above another in a stacking direction 104 and together form a fuel cell stack 106.

The fuel cell elements 102 are sealed off here from the surroundings by means of a plurality of sealing layers 108.

At both ends along the stacking direction 104 the fuel cell stack 106 borders on end plates 110 of the fuel cell device 100, wherein the end plates 110 are provided at both ends with a respective pickup unit 112 for removing electrical energy from the fuel cell stack 106.

The pickup units 112 each comprise here a pickup sheet 114 which abuts in a sealing and at the same time electrically contacting manner against the fuel cell stack 106 via a sealing layer 108.

Electric voltage is tapped off from a pickup sheet 114 via one or more pickup strips 116 and transmitted to one or more conducting pins 118.

However, instead of conducting pins 118, other connections, plug-in connections, etc. can also be provided.

It may be favourable if each pickup unit 112 has two obliquely, in particular substantially diagonally, mutually opposite pickup strips 116. By this means, optimized distribution of voltage in the fuel cell stack 106 and optimized thermal loading of the pickup unit 112 can be obtained.

Each end plate 110 preferably comprises a pickup receptacle 120 for receiving one pickup unit 112 in each case.

Each pickup receptacle 120 here comprises in particular one or more through holes for the passage of the conducting pin 118.

Figure 2:
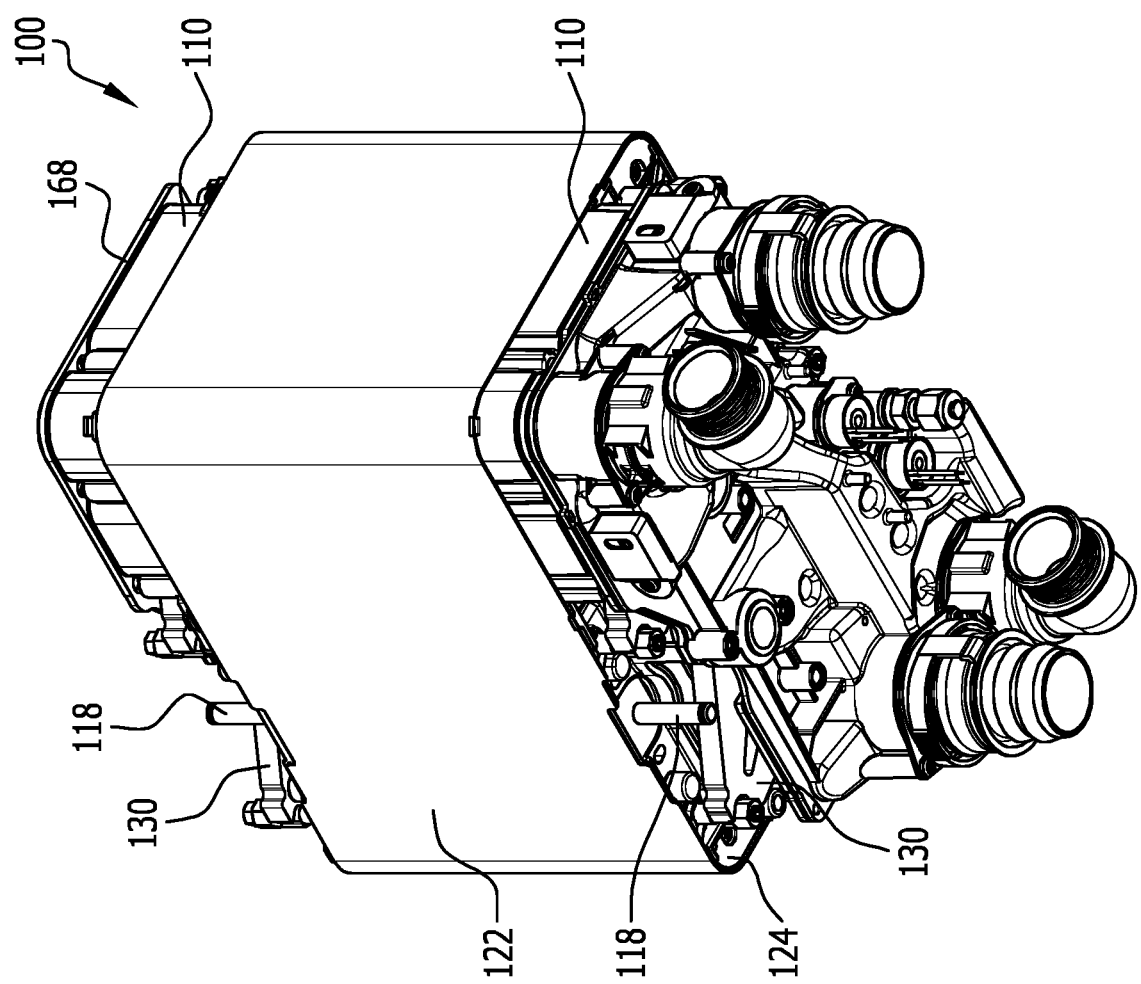
FIG. 2 shows a schematic perspective illustration of the fuel cell device from FIG. 1, looking at a lower side of the fuel cell device.
Figure 3:
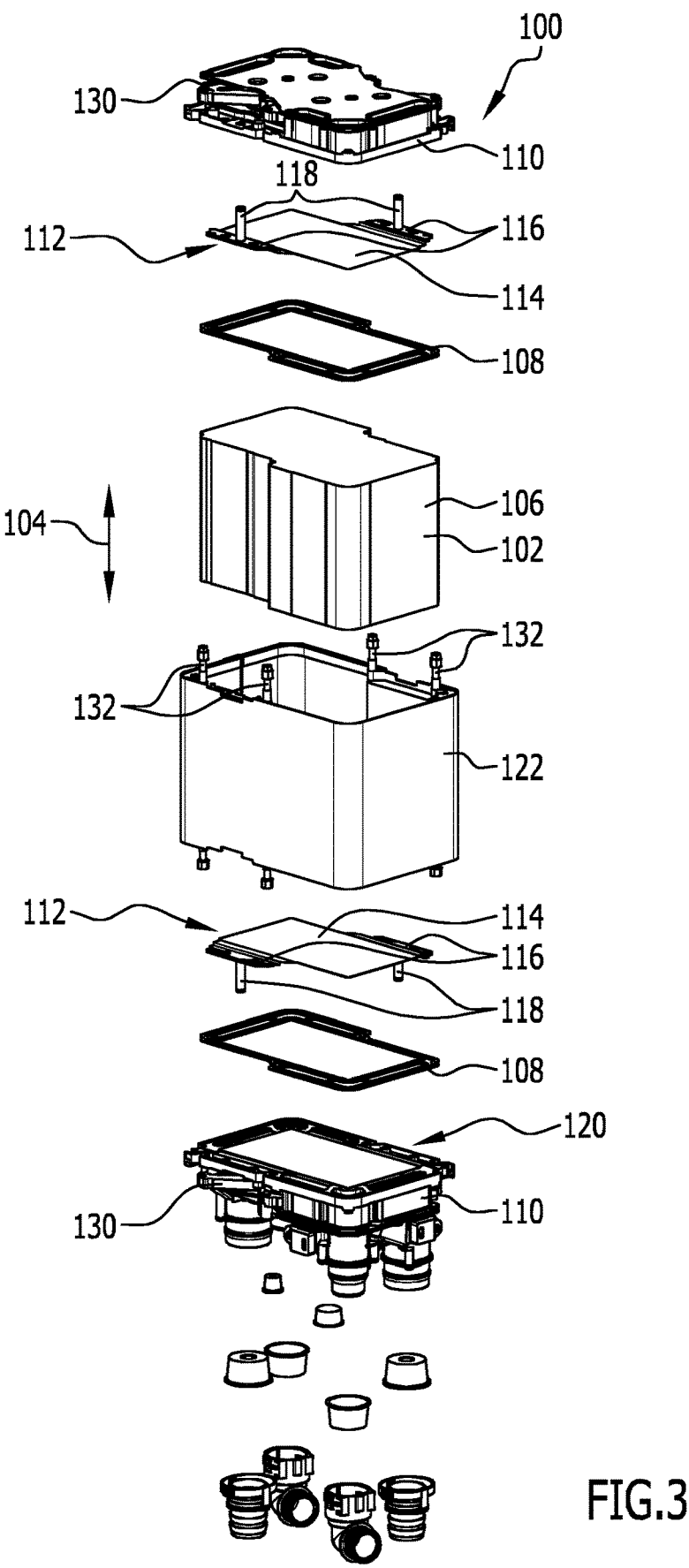
FIG. 3 shows a schematic perspective exploded illustration of the fuel cell device from FIG. 1.

As can be gathered in particular from FIGS. 1 to 3, the fuel cell device 100 furthermore comprises a housing 122 by means of which the fuel cell stack 106 is surrounded and protected against an external influence.

The housing 122 is formed in particular by a hollow-cylindrical body with a substantially rectangular base area and extends from one end plate 110 to the further end plate 110.

The housing 122 is preferably positioned and/or centred relative to the end plates 110 and/or relative to the fuel cell stack 106 by means of one or more centring caps 124 (see in particular FIGS. 1 and 2).

Figure 4:
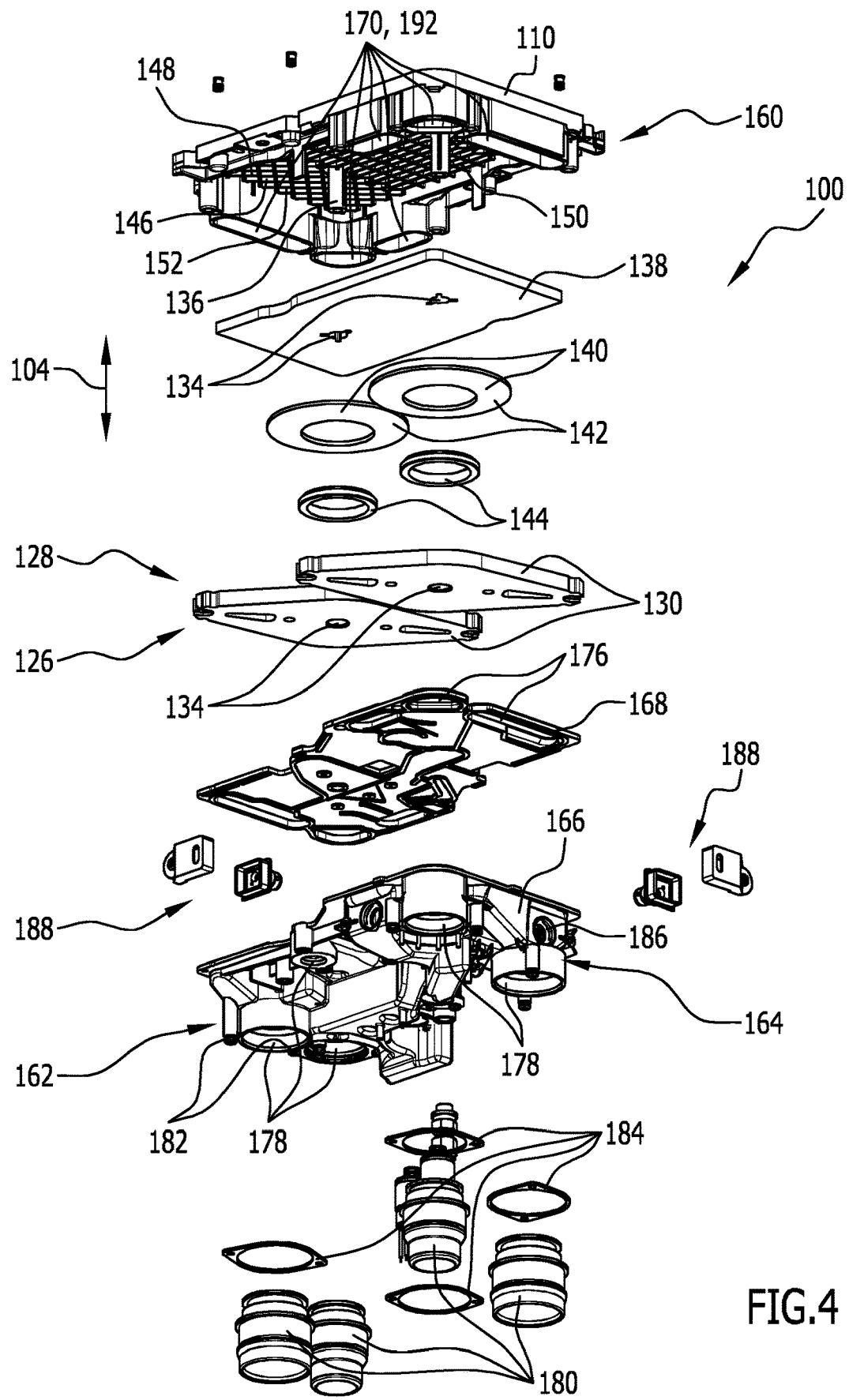
FIG. 4 shows a schematic perspective exploded illustration of components of the fuel cell device from FIG. 1 that are arranged below a fuel cell stack of the fuel cell device.
Figure 5:
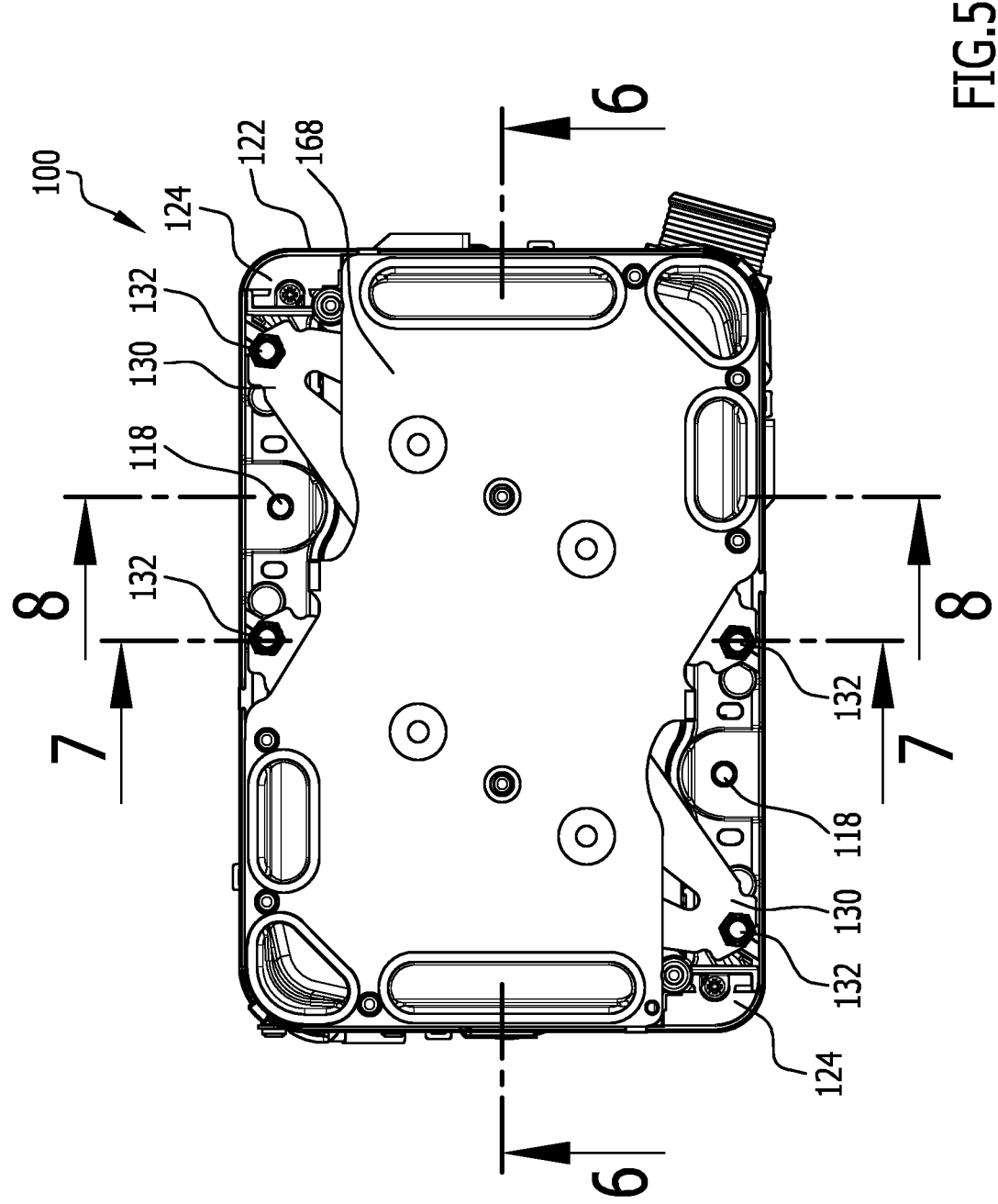
FIG. 5 shows a schematic top view of an upper side of the fuel cell device from FIG. 1.
Figure 6:
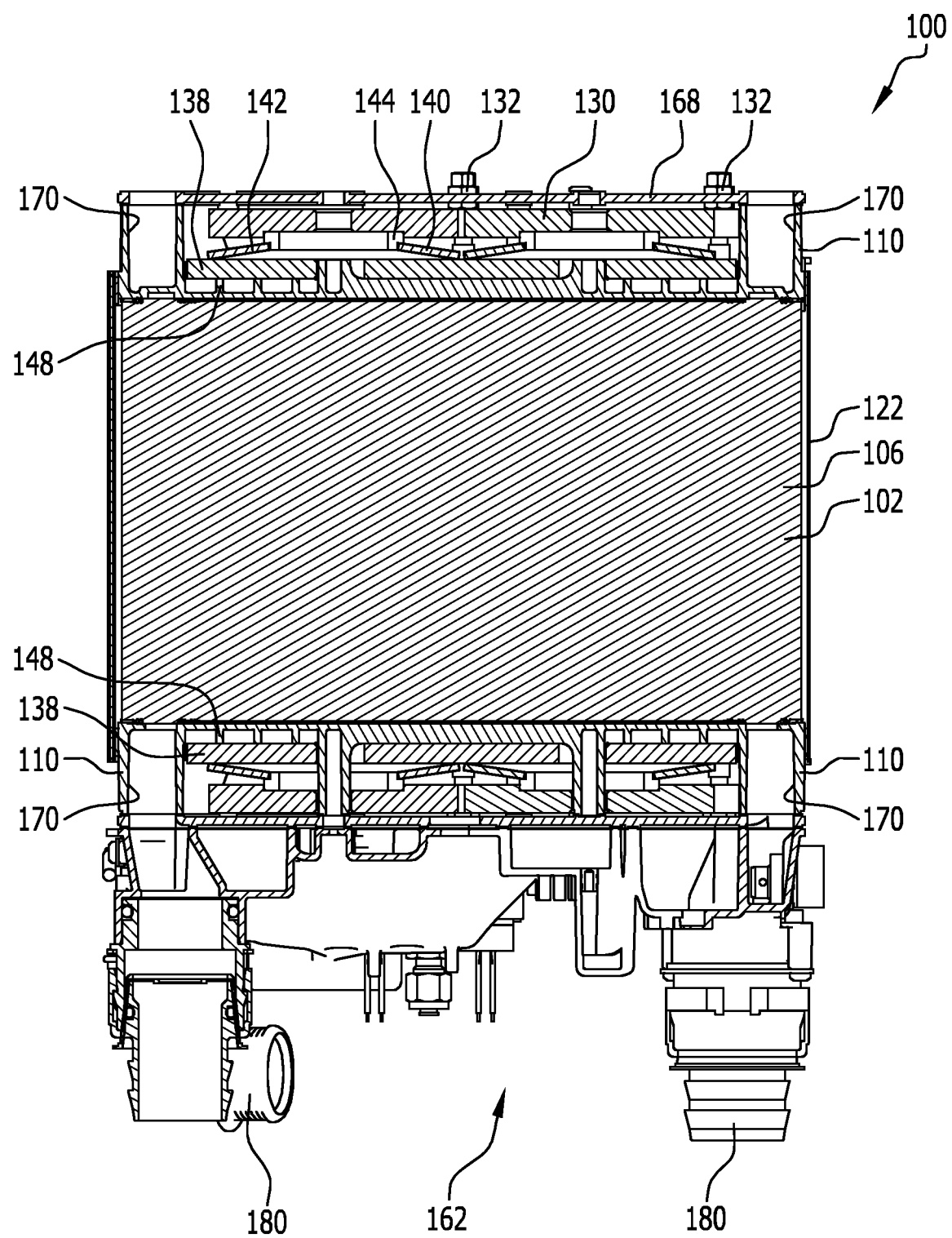
FIG. 6 shows a schematic vertical section through the fuel cell device from FIG. 1 along the line 6-6 in FIG. 5.
Figure 7:
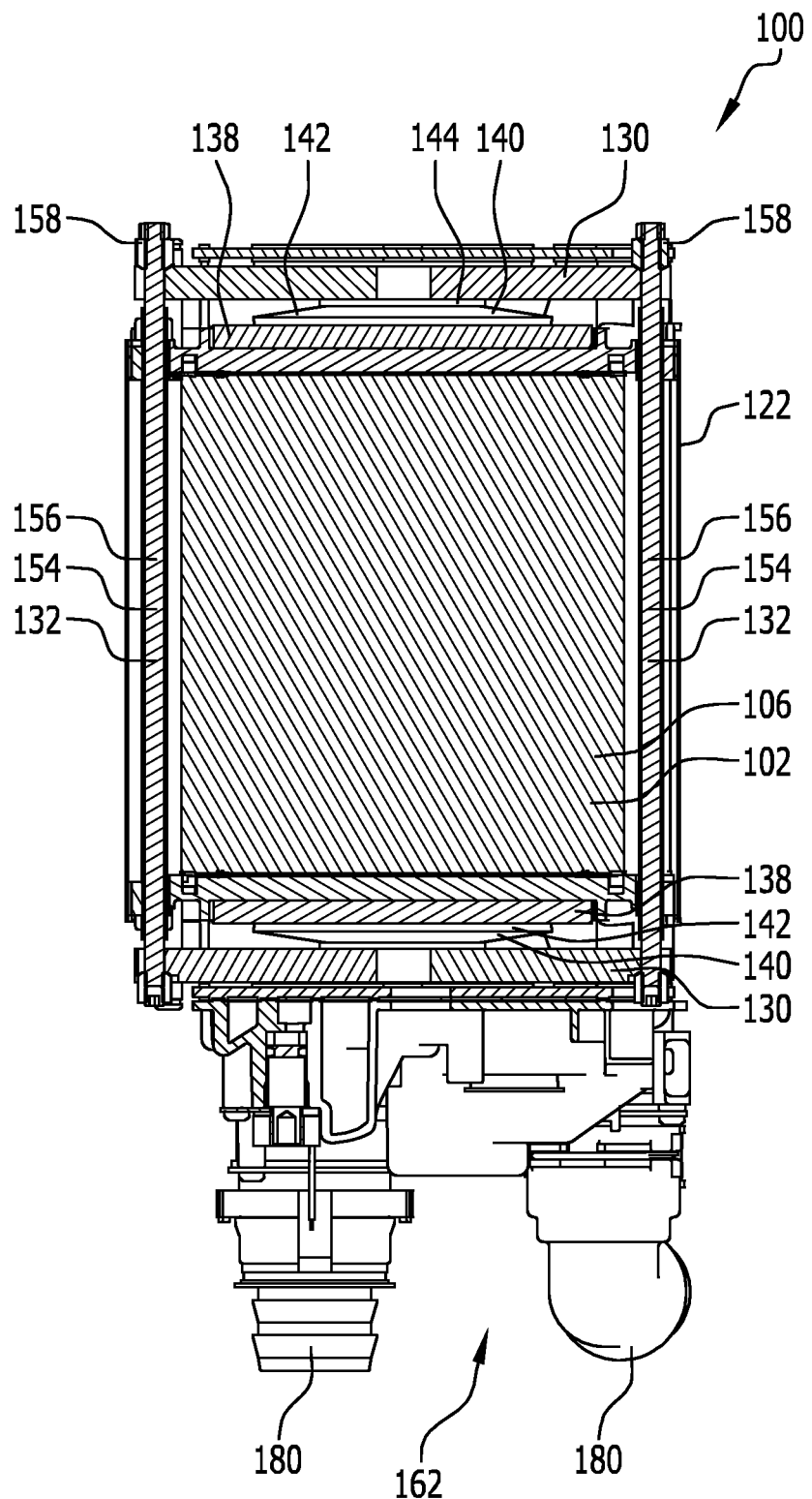
FIG. 7 shows a schematic vertical section through the fuel cell device from FIG. 1 along the line 7-7 in FIG. 5.
Figure 8:
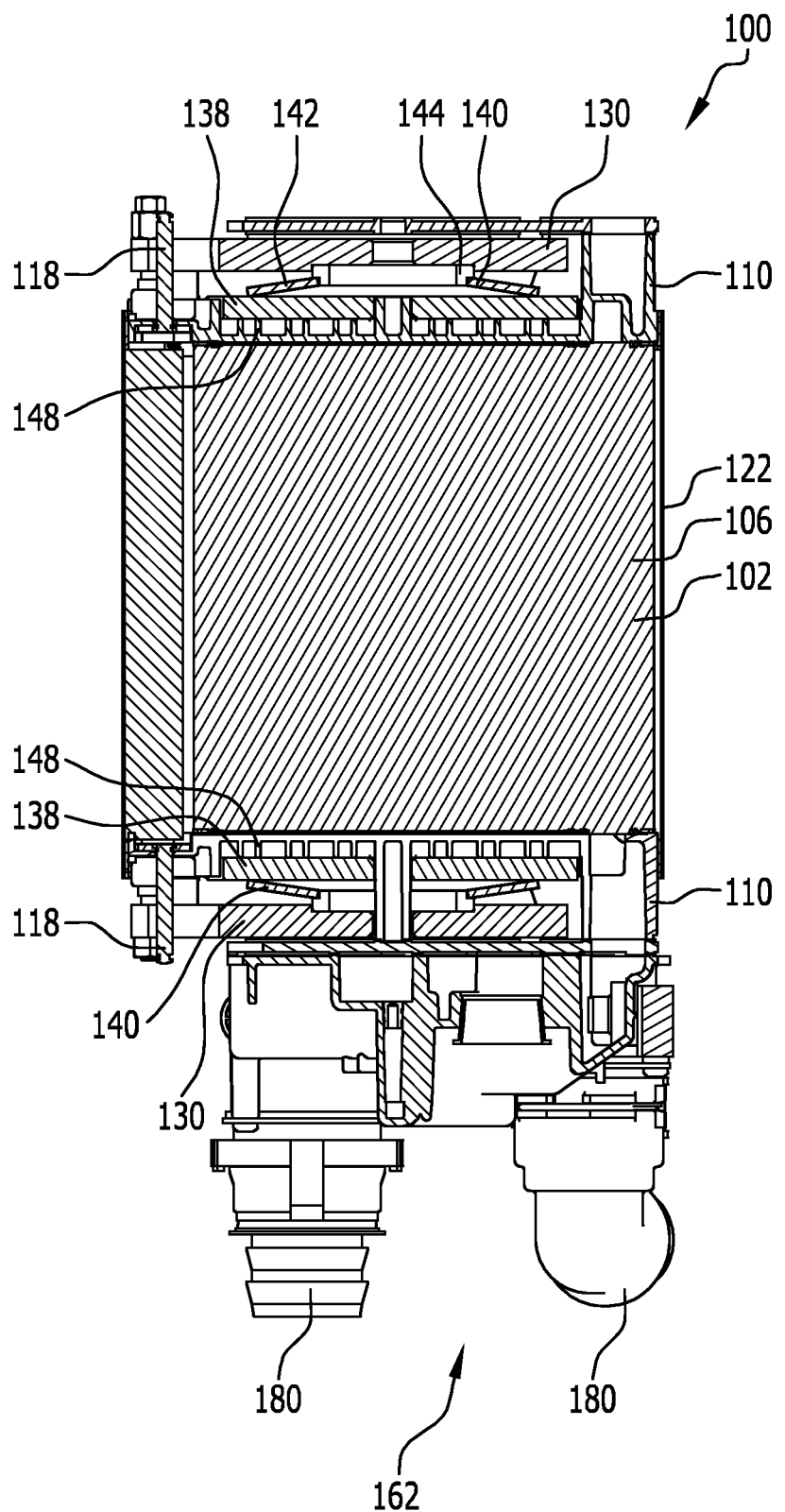
FIG. 8 shows a schematic vertical section through the fuel cell device from FIG. 1 along the line 8-8 in FIG. 5.
Figure 9:
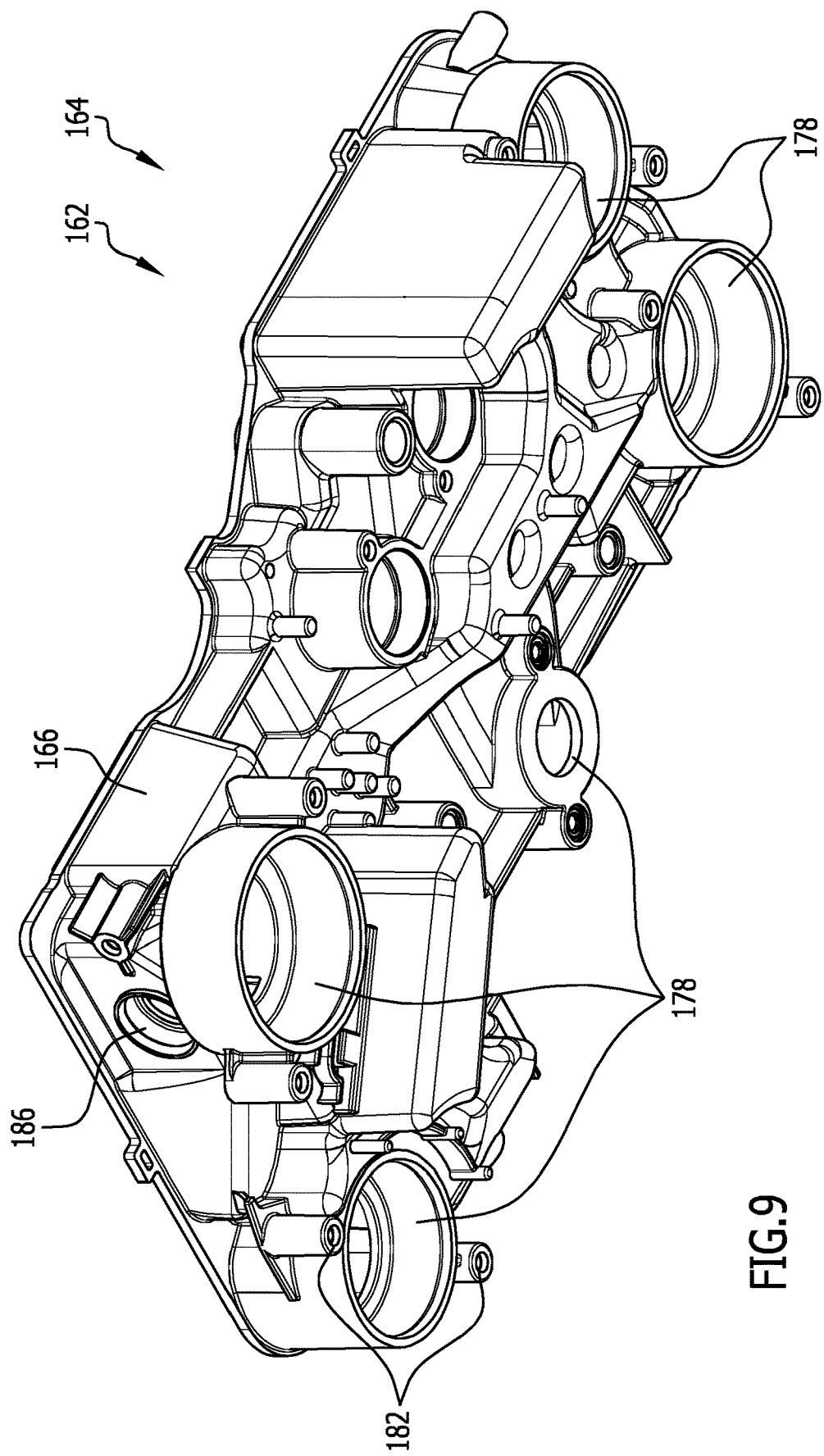
FIG. 9 shows a schematic perspective illustration of a basic body of a fluid guide unit of the fuel cell device from FIG. 1, looking at a lower side of the basic body.

As can be gathered in particular from FIGS. 1, 3 and 4, the fuel cell device 100 preferably comprises a securing device 126 for securing the fuel cell elements 102 relative to each other.

In particular, the securing device 126 comprises a clamping device 128 by means of which the fuel cell elements 102 are pressed onto one another in the stacking direction 104.

For this purpose; the clamping device 128 comprises in particular a plurality of crossmembers 130 which extend transversely, for example substantially perpendicularly, to the stacking direction 104, and therefore engage over and/or engage behind the fuel cell stack 106 and are drawable towards one another in the stacking direction 104 by means of clamping elements 132. The fuel cell stack 106 can therefore be clamped in particular between the crossmembers 130.

A crossmember 130 can be, for example, of substantially diamond-shape design, wherein two mutually opposite ends in particular form receptacles for the clamping elements 132.

In particular, a centring opening 134 which can be brought into engagement in particular with a centring projection 136 of an end plate 110 is arranged and/or formed substantially centrally in each crossmember 130.

By this means, the crossmember 130 can be oriented simply and exactly relative to the end plate 110.

It may be favourable if the clamping device 128 has two pairs of crossmembers 130, wherein in each case two clamping elements 132, are associated with each pair of crossmembers 130, and wherein in each case one crossmember 130 of each pair of crossmembers 130 is arranged at one end each of the fuel cell stack 106.

The crossmembers 130 act in particular via a pressure distribution plate 138 on the end plate 110 and via the end plate 110 on the pickup unit 112 and finally on the fuel cell stack 106.

To even out an introduction of force, one or more spring elements 140, for example disc springs 142, are preferably provided, which are arranged in particular between the respective crossmember 130 and the pressure distribution plate 138.

One or more guide discs 144 preferably furthermore serve for positioning and/or centring the disc springs 142, in particular relative to the centring opening 134 and/or to the centring projection 136.

As can be gathered in particular from FIG. 4, a single pressure distribution plate 138 is preferably provided for two crossmembers 130, wherein a separate disc spring 142 and a separate guide disc 144 is associated with each crossmember 130. Two centring projections 136 which are formed, for example, on the end plate 110 preferably position the pressure distribution plate 138, which has two centring openings 134 for this purpose, and the spring elements 140, the guide discs 144 and the crossmembers 130.

The end plate 110 furthermore preferably comprises a plate receptacle 146 for receiving and/or positioning the pressure distribution plate 138.

The plate receptacle 146 preferably comprises a force transmission structure 148 which in particular comprises or forms a honeycomb structure 150 or a supporting structure 152.

A uniform introduction of force from the pressure distribution plate 138 to the pickup unit 112 and finally to the fuel cell stack 106 can be obtained in particular by means of the force transmission structure 148, in particular since the force transmission structure 148 can preferably be produced with smaller tolerances and therefore lower manufacturing inaccuracies.

For this purpose, the entire end plate 110 including the force transmission structure 148 is formed in particular as a plastics injection-moulded component.

The pressure distribution plate 138, the spring elements 140, the guide discs 144 and the crossmembers 130 are preferably formed from a metallic material.

The clamping elements 132 are preferably also formed from a metallic material.

In particular, the clamping elements 132 are clamping rods 154, for example threaded rods 156, onto which screw nuts 158 can be screwed at both ends in order ultimately to clamp the crossmembers 130 in place.

The components of the clamping device 128 are preferably thermally and/or mechanically and/or spatially separated from the fuel cell stack 106 by means of the end plates 110 formed in particular from a plastics material.

In particular, the force transmission structure 148 forms a thermally insulating portion 160.

As can be gathered in particular from FIG. 4, the fuel cell device 100 furthermore comprises a fluid guide unit 162.

The fluid guide unit 162 forms or comprises in particular a media module 164 for distributing media and/or guiding media.

The fluid guide unit 162 in this case preferably comprises a basic body 166 which is illustrated separately in FIGS. 9 to 14.

The basic body 166 is covered in particular by means of one or more cover elements 168, as a result of which in particular a plurality of fluid lines 170 and other cavities are formed in the fluid guide unit 162.

The basic body 166 is preferably a plastics injection-moulded component like the cover element 168.

The plastics injection-moulded components are preferably provided with numerous recesses 172 and/or raised portions 174 and/or passage openings 176, as a result of which ultimately the fluid line 170 is formed with predetermined shapes and dimensions.

In particular, the basic body 166 comprises a plurality of connection points 178 on which, for example connectors 180 are mountable in order ultimately to be able to connect media lines to the fuel cell device 100 and to supply the media from outside the fuel cell device 100 to the fuel cell stack 106.

For this purpose, the connection points 178 are provided in particular with fastening points 182 on which, for example, holding-down devices 184, plate anchors, etc. for securing connectors 180 or other components can be arranged.

Furthermore, the basic body 166 preferably comprises one or more receptacles for other additional components and/or connections, for example electric connections.

Figure 14:
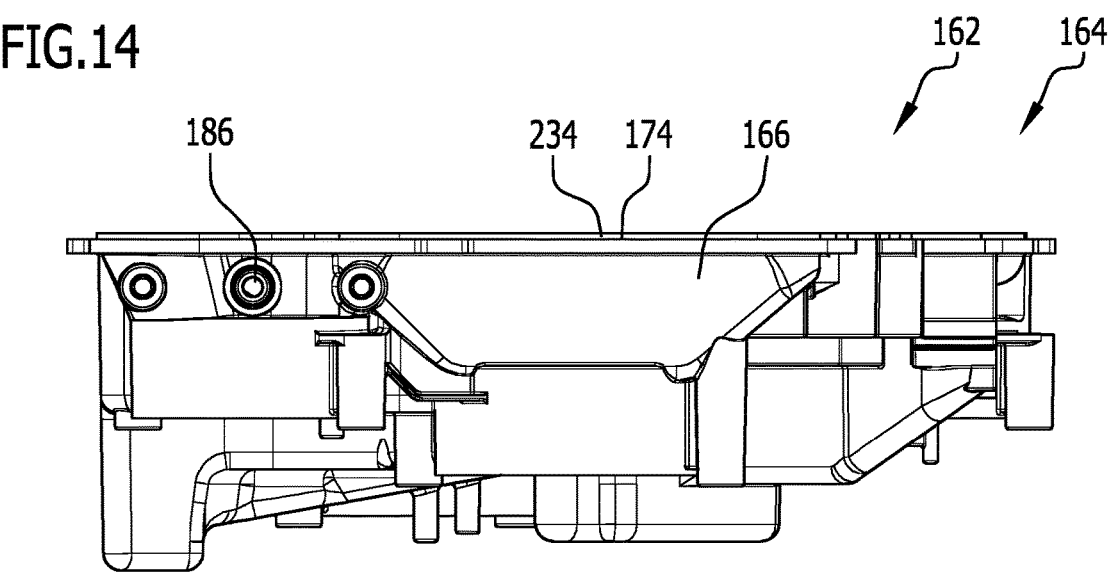
FIG. 14 shows a further schematic side view of the basic body from FIG. 9.

In particular, one or more sensor element receptacles 186 are provided for receiving sensor elements 188 (see in particular FIGS. 4 and 14).

The sensor elements 188 are in particular pressure sensor elements and/or temperature sensor elements.

As emerges in particular from FIG. 4, the basic body 166 and the cover element 168 covering the basic body 166 are arranged on a side of the crossmember 130 and of the entire clamping device 128 that faces away from the fuel cell stack 106.

The mechanical fastening of the basic body 166 takes place here via the end plate 110 to which the cover element 168 is fixedly welded. The basic body 166 is fixedly welded in turn to the cover element 168.

The end plate 110 preferably likewise comprises one or more fluid lines 170 which in particular form a flow guide 192.

Each medium guided in the basic body 166 can preferably be guided past the clamping device 128 by means of the end plate 110 and supplied to the fuel cell stack 106. In particular, contact of the media with the components of the clamping device 128 can thereby be avoided, which ultimately minimizes heat transmission and chemical loading.

Figure 10:
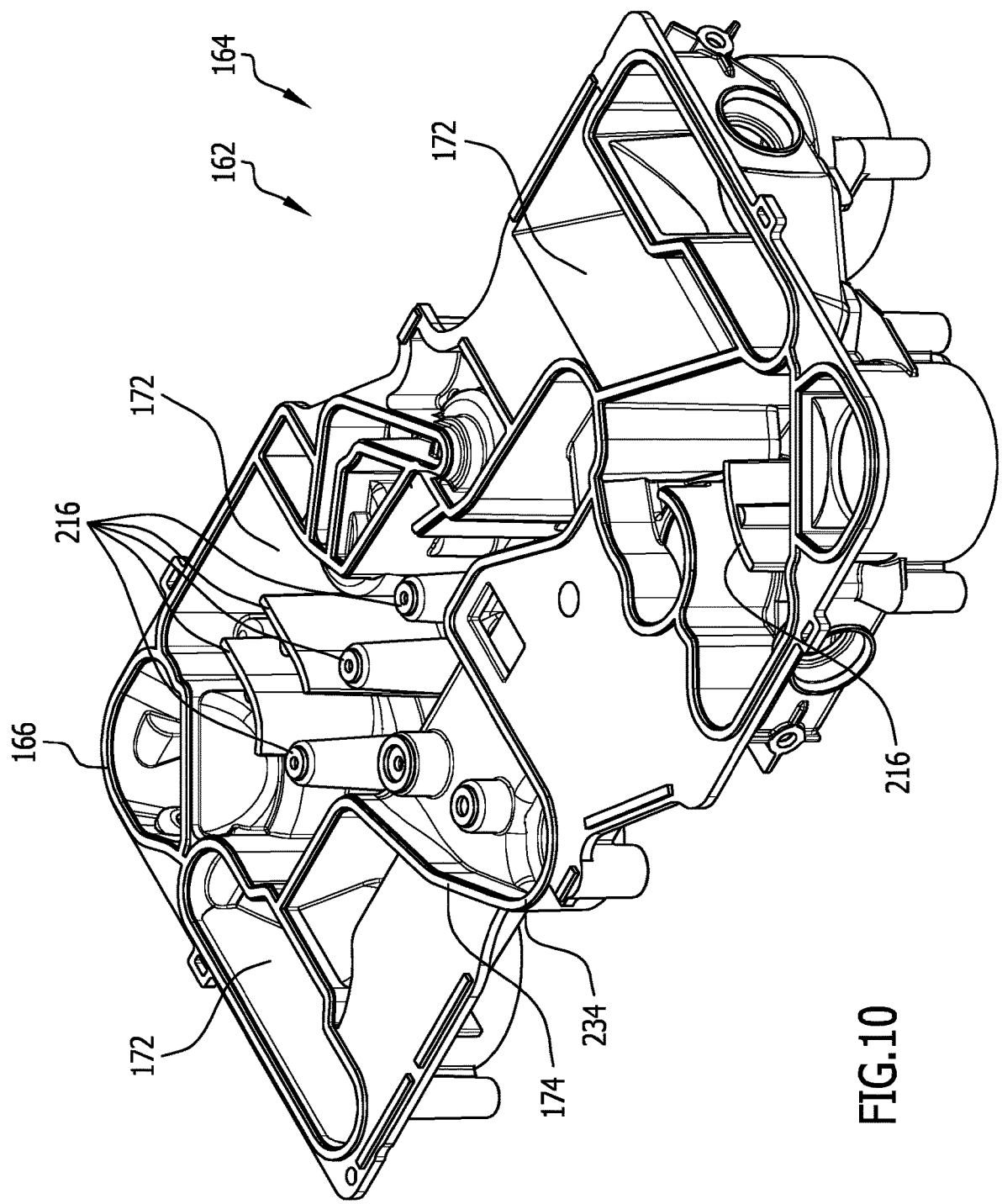
FIG. 10 shows a schematic perspective illustration of the basic body from FIG. 9, looking at the upper side thereof.
Figure 11:
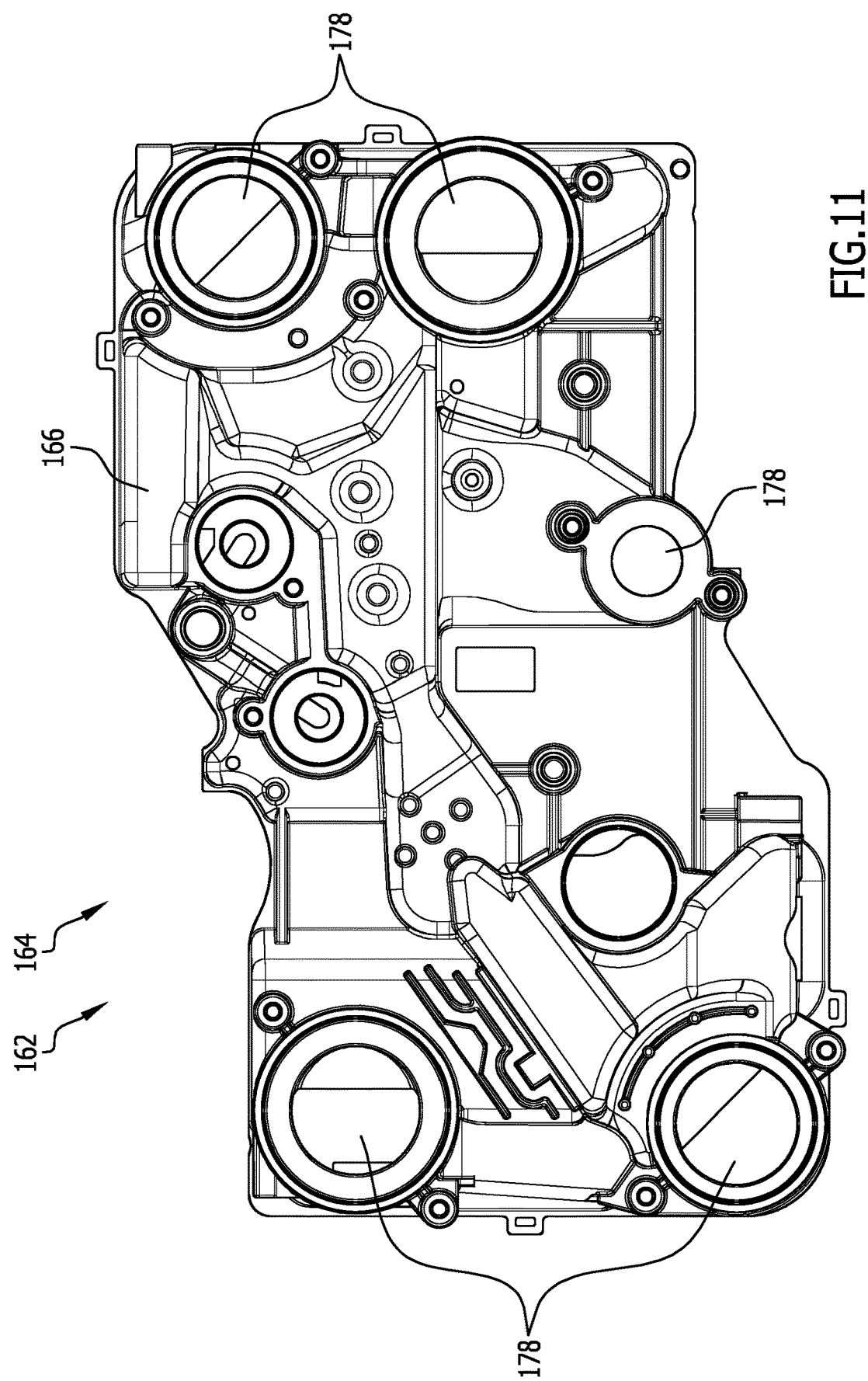
FIG. 11 shows a schematic top view of a lower side of the basic body from FIG. 9.
Figure 12:
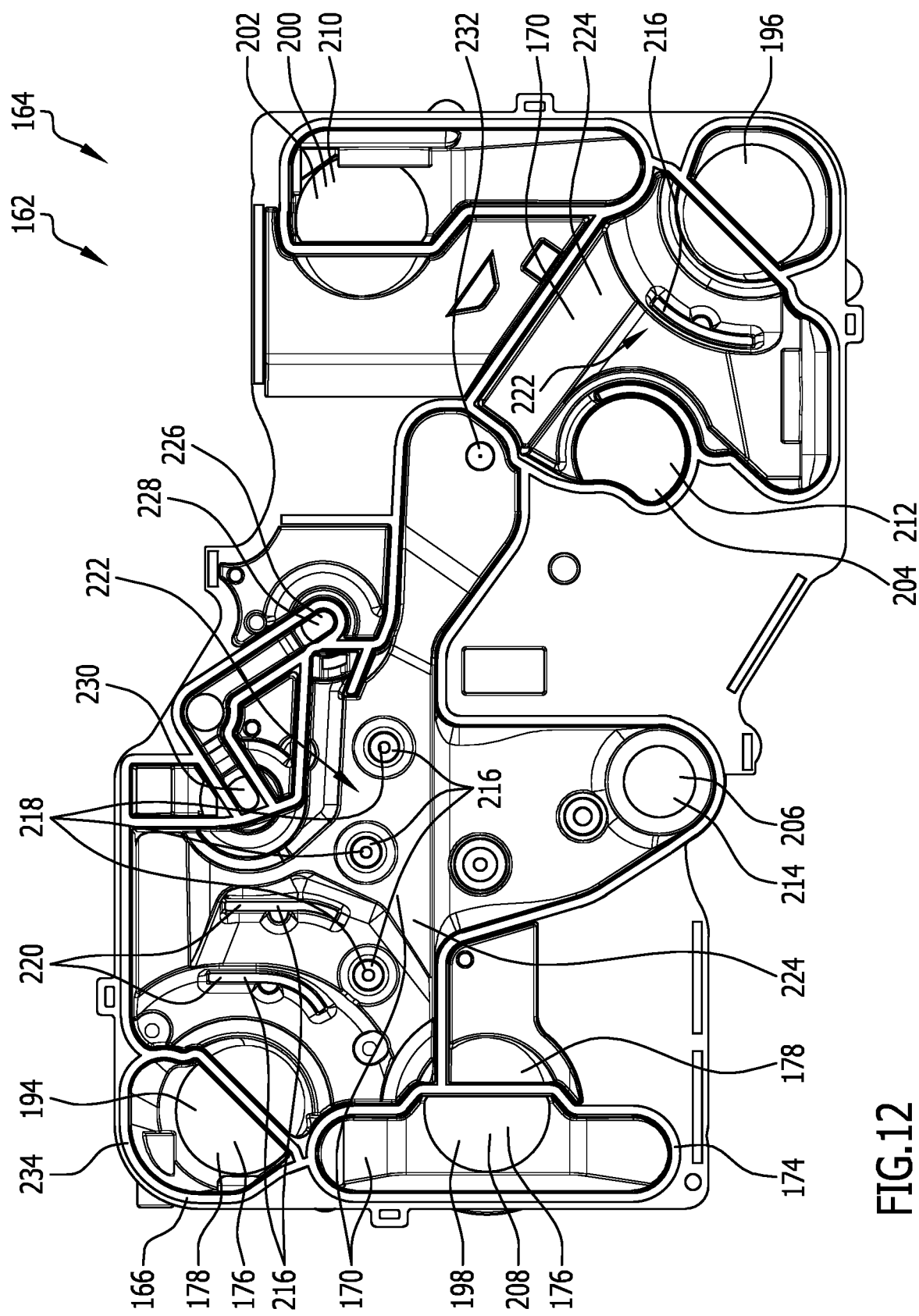
FIG. 12 shows a schematic top view of an upper side of the basic body from FIG. 9.
Figure 13:
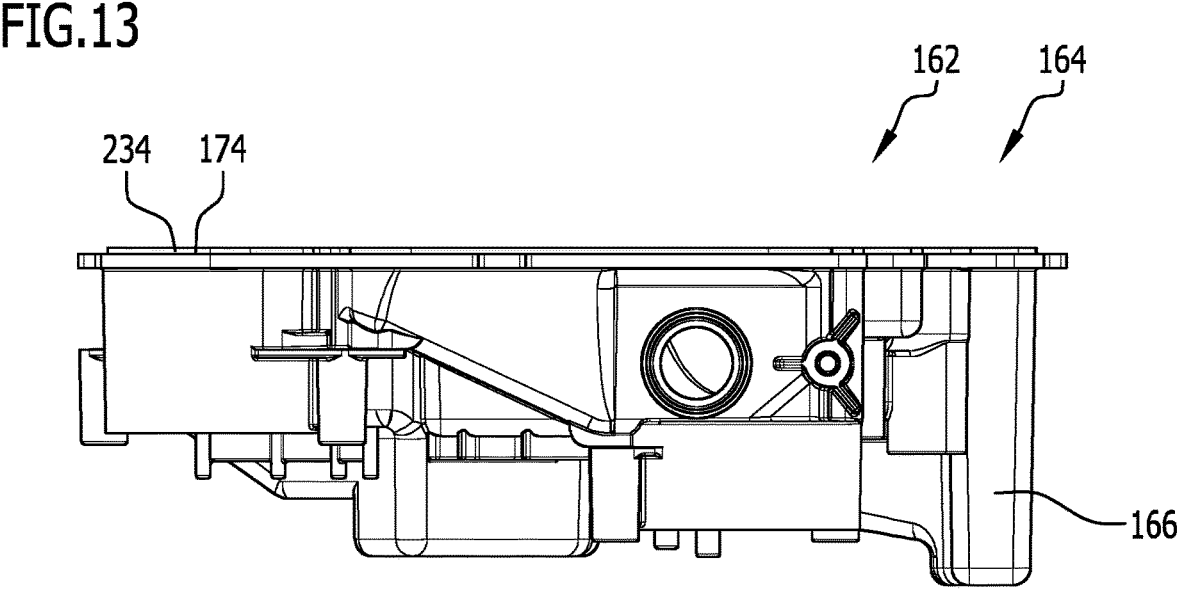
FIG. 13 shows a schematic side view of the basic body from FIG. 9.

As can be gathered in particular from FIGS. 10 and 12, the basic body 166 and therefore also the fluid guide unit 162 comprise a plurality of passage openings 176 and connection points 178 for the media supply of the fuel cell stack 106.

In particular, the following components are provided in this connection: a coolant inlet 194, a coolant outlet 196, an oxidizer supply means 198, an oxidizer removal means 200, which in particular simultaneously forms an exhaust gas removal means 202, a fuel supply means 204 and a fuel removal means 206.

The oxidizer supply means 198 is in particular an air inlet 208. The oxidizer removal means 200 is in particular an air outlet 210. The fuel supply means 204 is in particular a hydrogen inlet 212. The fuel removal means 206 is in particular a hydrogen outlet 214.

The hydrogen is preferably guided in a circuit by means of a recirculation unit (not illustrated).

An outlet of the circulation unit is preferably connected to the hydrogen inlet 212. An inlet of the recirculation unit is preferably connected to the hydrogen outlet 214.

Furthermore, a plurality of supporting elements 216 are preferably integrated and/or moulded into the basic body 166.

Supporting elements 216 are in particular supporting domes 218 and/or supporting ribs 220.

One or more supporting elements 216 preferably serve firstly to mechanically stabilize the basic body 166, in particular by supporting and/or reinforcing walls of the basic body 166. Secondly, one or more supporting elements 216 can serve as separating elements of separating devices 222. For example, one or more separating devices 222 configured as droplet separators 224 are integrated in the basic body 166 or are formed by the same.

For example, a droplet separator 224 for separating water can be arranged and/or formed downstream of the hydrogen outlet 214 (anode outlet) or therein.

As an alternative or in addition thereto, a droplet separator 224 can be arranged and/or formed upstream of the hydrogen inlet 212 (anode inlet) or therein.

Furthermore, one or more valve elements 226 and/or receptacles therefor can be integrated in the basic body 166.

A valve element 226 can be, for example, a purge valve 228, a drainage valve 230 and/or a throttle nozzle 232.

Different fluid lines 170 of the fluid guide unit 162 can be connected to one another here by means of the valve elements 226 in order to be able to control and/or regulate pressure conditions within the fluid guide unit 162 in a targeted manner and/or in order to be able to reliably remove separated fluid, in particular water.

Furthermore, one or more valve elements 226 can be provided for flooding and/or flushing individual fluid lines 170 or the entire fuel cell device 100.

As emerges in particular from FIG. 10, the raised portions 174 of the basic body 166 in particular form welding webs 234 which can be brought into engagement, in particular can be connected in an integrally bonded manner, to welding webs 234 corresponding thereto on the cover element 168.

By means of the configuration of the basic body 166 as an integral plastics injection-moulded component, numerous functions can preferably be integrated into a single component or a single functional unit of the fuel cell device 100. By this means, the fuel cell device 100 can firstly be produced cost-effectively. Secondly, the number of interfaces can thereby be reduced, as a result of which in particular optimized sealing of the fluid guide unit 162 is obtainable.

The invention claimed is:

1. A fuel cell device, comprising the following:
a plurality of fuel cell elements which are stacked one on top of another along a stacking direction and form a fuel cell stack;
a clamping device for securing the fuel cell elements;
a fluid guide unit for supplying fuel and/or oxidizer and/or coolant to the fuel cell elements and/or for removing fuel and/or oxidizer and/or exhaust gas and/or coolant from the fuel cell elements,
wherein the clamping device comprises two or more crossmembers which extend at least approximately perpendicularly to the stacking direction, wherein in each case at least one crossmember is arranged at each end of the fuel cell stack, wherein the crossmembers are drawable towards one another by means of clamping elements and the fuel cell stack is thereby clampable between the crossmembers, and
wherein the clamping device has at least two crossmembers for each of the two ends of the fuel cell stack and/or wherein the crossmembers are drawable towards one another by means of clamping rods.

2. The fuel cell device as claimed in claim 1, wherein the clamping rods are threaded rods.

3. The fuel cell device as claimed in claim 1, wherein the clamping elements run completely outside the fuel cell stack.

4. A fuel cell device, comprising the following:
a plurality of fuel cell elements which are stacked one on top of another along a stacking direction and form a fuel cell stack;
a clamping device for securing the fuel cell elements;
a fluid guide unit for supplying fuel and/or oxidizer and/or coolant to the fuel cell elements and/or for removing fuel and/or oxidizer and/or exhaust gas and/or coolant from the fuel cell elements,
wherein the clamping device comprises two or more crossmembers which extend at least approximately perpendicularly to the stacking direction, wherein in each case at least one crossmember is arranged at each end of the fuel cell stack, wherein the crossmembers are drawable towards one another by means of clamping elements and the fuel cell stack is thereby clampable between the crossmembers, and
wherein the fuel cell stack is provided at one or at both of its ends with a respective end plate made from an electrically insulating material.

5. The fuel cell device as claimed in claim 4, wherein one end plate or both of the end plates comprises/comprise a flow guide for guiding oxidizer, fuel, exhaust gas and/or coolant, wherein fluid lines for guiding the oxidizer, fuel, exhaust gas and/or coolant are arranged and/or configured so as to be completely separate fluidically from the clamping device.

6. The fuel cell device as claimed in claim 4, wherein one end plate or both of the end plates each has/have a force transmission structure which transmits a force, which is applied by one or more of the crossmembers, to the fuel cell stack with a predetermined distribution of force, wherein the force transmission structure comprises a honeycomb structure and/or rib structure and/or supporting structure or is formed therefrom.

7. The fuel cell device as claimed in claim 4, wherein the one end plate or the two end plates each comprises/comprise a pickup receptacle for receiving one pickup unit each, by means of which electrical energy generated in the fuel cell stack is removable, wherein the one end plate or the two end plates electrically insulate the pickup unit arranged in each case thereon and the clamping device from each other.

8. The fuel cell device as claimed in claim 1, wherein the clamping device has one or two pressure distribution plates which abut directly against end plates of the fuel cell stack and on which the crossmembers indirectly or directly act.

9. The fuel cell device as claimed in claim 8, wherein the one or more pressure distribution plates is/are arranged in plate receptacles, which are formed substantially complementarily thereto, of the end plates and/or wherein the crossmembers act on the one or the two pressure distribution plates by means of in each case one or more spring elements.

10. The fuel cell device as claimed in claim 1, wherein fuel, oxidizer, exhaust gas and/or coolant are guidable, by means of an one end plate or two end plates along the stacking direction on at least one crossmember and/or on a pressure distribution plate of the clamping device.

11. A fuel cell device, comprising the following:
a plurality of fuel cell elements which are stacked one on top of another along a stacking direction and form a fuel cell stack;
a securing device for securing the fuel cell elements;
a fluid guide unit for supplying fuel and/or oxidizer and/or coolant to the fuel cell elements and/or for removing fuel and/or oxidizer and/or exhaust gas and/or coolant from the fuel cell elements,
wherein the securing device includes two or more crossmembers which extend at least approximately perpendicularly to the stacking direction,
wherein the fluid guide unit comprises a basic body which comprises a plurality of fluid lines and connection points for the connection of supply lines and/or removal lines and/or additional components of the fuel cell device,
wherein the plurality of fluid lines of the fluid guide unit are formed by recesses formed in the basic body and one or more cover elements covering said recesses, and
wherein the basic body and the one cover element or the plurality of cover elements are adhered or connected to one another.

12. The fuel cell device as claimed in claim 11, wherein the basic body is of integral construction and/or wherein the basic body is configured as a plastics injection-moulded component.

13. The fuel cell device as claimed in claim 11, wherein the one cover element or the plurality of cover elements is/are arranged on a side of the fluid lines of the fluid guide unit that faces the securing device.

14. The fuel cell device as claimed in claim 11, wherein the basic body is covered on one side or both sides with respect to the stacking direction by means of in each case one or more cover elements.

15. The fuel cell device as claimed in claim 11, wherein the fluid guide unit comprises a plurality of fluid lines which each extend through the basic body, one or more cover elements and an end plate of the fuel cell stack and/or wherein the fluid guide unit or the basic body comprises one or more separating devices for separating liquids and/or solids from a gas flow, wherein one or more separating devices are moulded into the basic body and/or are formed by suitable shaping of the basic body.

16. The fuel cell device as claimed in claim 11, wherein the basic body comprises one or more valve receptacles for receiving one or more valve elements, and/or wherein the basic body comprises one or more sensor element receptacles for receiving one or more sensor elements.

17. The fuel cell device as claimed in claim 11, wherein the basic body comprises one or more supporting elements for stabilizing and/or reinforcing the basic body and/or the fluid guide unit.

18. The fuel cell device as claimed in claim 11, wherein the fluid guide unit or the basic body and/or one or more cover elements and/or one or more end plates of the fuel cell device have an at least partially after-treated surface.

19. The fuel cell device as claimed in claim 11, wherein the fluid guide unit comprises a thermally insulating portion by means of which the securing device and/or the fluid lines and/or one or more separating devices and/or one or more valve elements are thermally separated from the fuel cell stack.

20. The fuel cell device as claimed in claim 4, wherein the clamping device acts indirectly or directly on the one end plate or on the two end plates.

21. The fuel cell device as claimed in claim 11, wherein the basic body and the one cover element or the plurality of cover elements are adhered or connected to one another by plastics welding.

* * * * *